Nov. 12, 1935.　　　M. E. HENNING　　　2,020,835
DEFROSTER SWITCH
Filed May 1, 1933
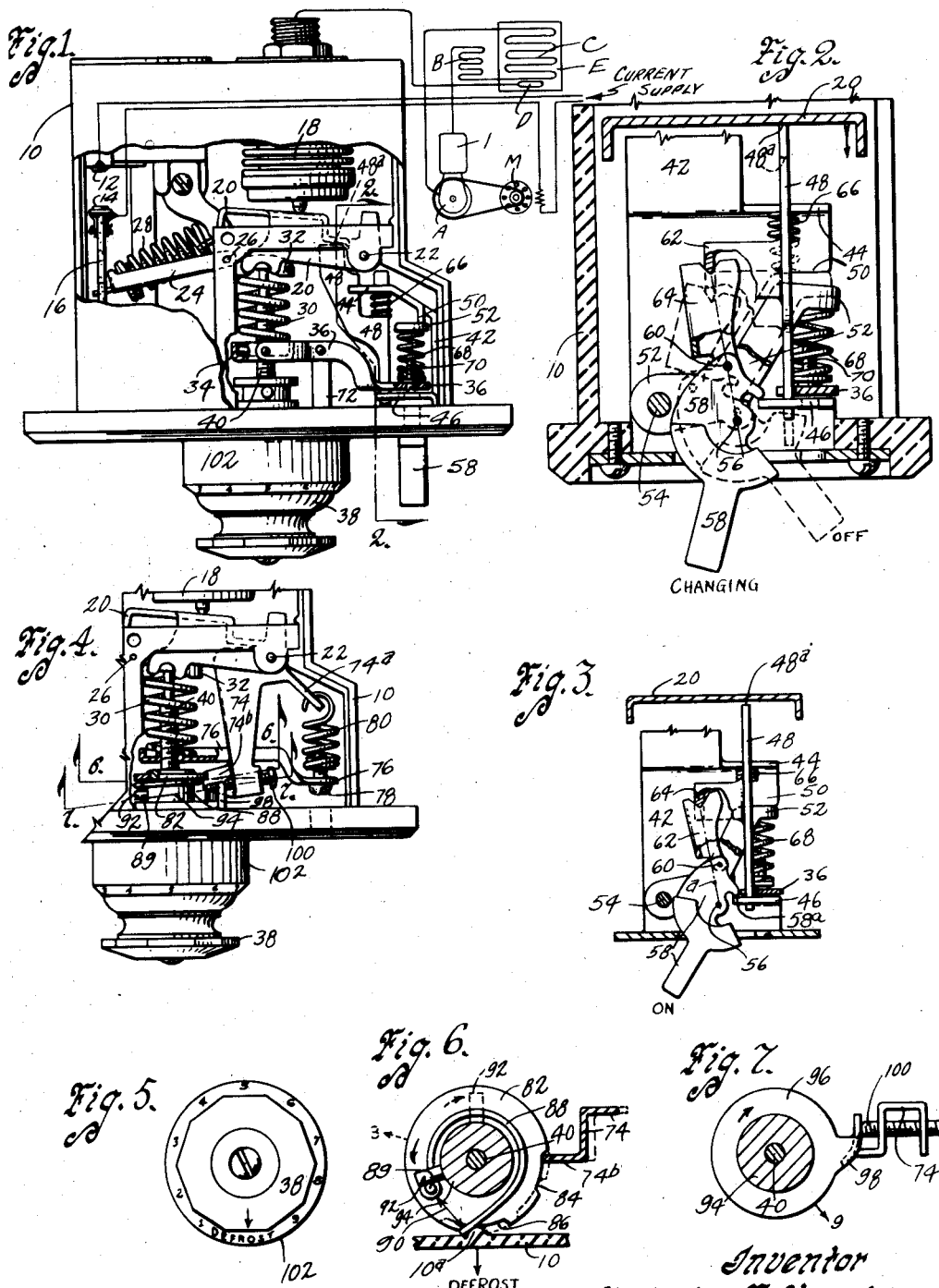
Inventor
Malcolm E. Henning
by Bair, Freeman & Sinclair
Attorneys Patented Nov. 12, 1935

2,020,835

UNITED STATES PATENT OFFICE 2,020,835

DEFROSTER SWITCH

Malcolm E. Henning, Des Moines, Iowa, assignor to Penn Electric Switch Co., Des Moines, Iowa, a corporation of Iowa Application May 1, 1933, Serial No. 668,773

10 Claims. (Cl. 200—83)

The object of my invention is to provide a defroster switch which is simple, durable and comparatively inexpensive to manufacture.

A further object is to provide for use with an automatic controlling device, means for prolonging one of the cycles thereof so that when the controlling device, for instance is used for automatically controlling an electrically operated refrigerator, the device can be set for prolonging one of the de-energized cycles to permit the temperature of the refrigerator to rise and defrost the cooling unit thereof, the controlling device involving a spring loading feature for the defrosting, and a manual adjusting feature for the range of the device which are so associated that the defrosting high temperature limit will remain practically constant regardless of the position of the manual adjustment.

A further object is to provide means for modifying one of the cycles of operation of the device, such means comprising a control mechanism and means for spring loading it in one direction until a predetermined movement has occurred, whereupon the device is automatically unloaded and permits the control mechanism to re-continue its normal automatic operation, the unloading point in the operation of the device being maintained constant regardless of a range adjusting feature by associating a movable part of the range adjusting feature with the loading spring to vary its tension.

A further object of my invention is to provide a control mechanism for refrigerators comprising means for starting and stopping operation of the refrigerator to obtain normal cycles of operation, or permit operation of the refrigerator at a predetermined factory setting and to provide means for securing temporary modification of the factory setting of the refrigerator to obtain different normal cycles of operation, which is usually done by the operator of the refrigerator or housewife without loosing the factory setting and to provide means for obtaining either non-normal cycles of operation of the refrigerator for defrosting purposes or for obtaining a single one of such non-normal cycles, the temporary modification of the cycles of operation as well as the non-normal cycles of operation being manually controlled by either a separate or common means, whereby the operator or housewife in connection with domestic refrigeration may secure normal operation of the refrigerator at temperatures other than the factory setting and likewise secure operation of the refrigerator in a non-normal cycle or non-normal cycles for defrosting purposes, the temporary non-normal cycles, regardless of the setting therefor, having no effect on the defrosting limit of the control by reason of association between the mechanism for the temporary non-normal operation and the mechanism for the defrosting operation.

An additional object is to provide means for modifying one of the cycles of operation of a refrigerator control switch, such means comprising a control mechanism and means for spring loading it in one direction until a predetermined movement has occurred, whereupon the device is automatically unloaded and permits the control mechanism to re-continue its normal automatic operation, the mechanism being adjustable so that if desired, the spring loading can continue each cycle of operation until it is selectively restored to unloading position, the control switch having an adjusting means to vary its range, the adjusting means being associated with the loading spring to inversely vary its tension.

Still a further object is to provide a differential adjusting or modifying means for a control switch which is controlled by a knob or the like having three different positions, one to cause a modifying action each cycle of operation of the control switch, another to restore the switch to normal position after it has been adjusted for the modifying operation and a third to cause the modifying operation to occur for only a single cycle of operation after the control knob has been moved to the first mentioned position and then to a range adjusting position, the knob in its range adjusting position being associated with the mechanism for obtaining the single cycle of operation to maintain substantially equal the temperature limit occurring at the end of the single cycle of operation.

With these and other objects in view my invention consists in the construction, arrangement and combination of the various parts of my device, whereby the objects contemplated are attained, as hereinafter more fully set forth, pointed out in my claims, and illustrated in the accompanying drawing, in which:

Figure 1 is a plan view of a defroster switch embodying my invention, part of the cover being broken away and parts of the switch mechanism being shown in section in order to more clearly illustrate my invention, a diagrammatic view of an electric refrigeration system being associated with the figure.

Figure 2 is an enlarged sectional view on the line 2—2 of Figure 1 showing two different positions of the defroster mechanism.

Figure 3 is a view similar to Figure 2 except on a reduced scale and showing the defroster mechanism in a third position.

Figure 4 is a partial view of the switch in Figure 1 showing another type of defroster mechanism.

Figure 5 is a front view of the control knob and the hub supporting it in Figures 1 and 4; and Figures 6 and 7 are sectional views on the lines 6—6 and 7—7, respectively, of Figure 4.

On the accompanying drawing, I have used the reference numeral 10 to indicate a switch casing. Within the switch casing there is a stationary contact 12 and a movable contact 14. The contact 14 is carried by a slidable bar 16.

Means is provided for automatically engaging and separating the contacts 12 and 14 and consists of a pressure bellows 18, a power arm 20 pivoted at 22 and actuated by the bellows and a switch arm 24 pivoted at 26 and adapted to slide the bar 16. An overcenter spring 28 is interposed between the outer end of the power arm 20 and the outer end of the switch arm 24 for transmitting movement of the power arm to the switch arm and providing for snap action of the switch arm.

The pressure in the bellows 18 is opposed by a spring 30 which is interposed between cup members 32 and 34. The cup member 32 is pivoted to the power arm 20 and the cup member 34 is pivoted to a compensator arm 36. A control knob 38 is secured to a rod 40, which is threaded through the cup member 34, for adjusting the tension of the spring 30.

In Figure 1, I show diagrammatically a refrigerant compressor A, a condenser coil B and a cooling unit C. I also show a thermal bulb D which is connected with the bellows 18 for changing the pressure therein, depending on the temperature to which the bulb D responds, the bulb being located in the path of the air circulated by the cooling unit C. The contacts 12 and 14 are in the circuit of a motor M for the compressor A so that the motor is controlled depending on the temperature of the bulb D.

In Figures 1, 2 and 3, I have shown one type of defroster mechanism comprising a stationary bracket 42 having arms 44 and 46 for guiding a defroster element 48. The bracket 42 also has a stop 50 for an arm 52 pivoted at 54 on the bracket 42 (see Figure 2).

Pivoted at 56 on the arm 52 is an operating toggle lever 58 having a pivot 60. Interposed between the pivot 60 and a projection 62 on the defroster element 48 is a second toggle lever 64. A spring 66 is provided to normally keep the upper end 48a of the defroster element 48 spaced from the power arm 20, the spaced position being shown by dotted lines in Figure 2 and to force the projection 62 against the toggle lever 64 which acts as a limiting means for the element 48.

The operating toggle lever 58 has a lug 58a adapted to engage the arm 46 of the bracket 42 during the operation of the device, as will hereinafter be described. Interposed between the arm 52 and the compensator arm 36 is a loading spring 68 for defroster purposes. Its tension is made adjustable by a screw 70 shown in Figure 1.

The compensator arm 36 is pivoted to a stationary bracket 72, the pivot being intermediate the ends of the compensator arm so that when the tension of the spring 30 is increased, that of the spring 68 is decreased and vice versa. The defroster mechanism of Figures 1, 2 and 3 without the compensator arm 36 etc. is illustrated and described in fuller detail in my patent No. 1,891,537, dated December 20, 1932.

In Figures 4, 6 and 7, I have shown another form of defroster mechanism in which parts similar to Figure 1 bear the same reference numerals. The defroster element in Figure 4 is shown at 74 and is pivoted on the pin 22 rather than being slidable like the defroster element 48. A compensator arm 76 is provided supported by the adjusting rod 40 and acting in itself as a substitute for the spring cup 34 in Figure 1.

It is held in a position at right angles to the rod 40 by the spring 30 and has an adjusting screw 78 on its outer end associated with a loading spring 80 of the extension rather than compression type. The spring 80 is hooked to an extension 74a of the defroster element 74.

The defroster element 74 has a lug 74b adapted to coact with a cam 82. The cam has a notch 84 for the lug 74b to drop into when the notch is in registry with the lug (see Figure 6). The casing 10 has a stop projection 10a for a stop notch 86 in the cam 82.

The cam 82 is constrained in a clockwise direction to the dotted line position of Figure 6 by a spring 88, the ends of which tend to spread, as indicated by the arrow 90. It can be rotated to the full line position by a pin 92 projecting from a hub 94, which in turn extends from the control knob 38. The pin 92 is adapted to engage a pin 89 of the cam 82 for this purpose. The cam 82 is freely rotatable relative to the hub 94, but non-slidable relative thereto.

Extending from the hub 94 is a flange 96 having a cam 98 thereon. The cam 98 is adapted to coact with an adjustable screw 100 of the defroster arm 74.

The control knob 38 extends from a hub 102 having suitable connections thereon to indicate the particular range at which the switch is set by rotating the knob. This is shown in Figure 5, the figure showing a defrost position, which of course would be missing from the hub 102 of Figure 1 because the lever 58 is used for the defrosting operation instead of using the single knob for both range adjustment and defrosting as in Figure 4. The defroster mechanism of Figures 4, 6 and 7 without the compensator arm 76, etc. is illustrated and described in fuller detail in my co-pending patent application Serial No. 653,093, filed January 23, 1933.

*Practical operation*

In the operation of the device shown in Figures 1, 2 and 3, when it is desired to defrost the cooling unit C, the toggle lever 58 is engaged by the operator and moved to the position of Figure 3. It will be noted that the pivot 60 is slightly past a center line *a* extending between the pivots 56 and 62. The off position is shown by dotted lines in Figure 2, in which position it will be noted that the pivots 56 and 62 are proportionally closer together so that the upper end 48a of the defroster element 48 assumes its dotted line position and does not affect the power arm 20. With the parts in the position of Figure 3, however, the defroster element 48 is in a position to be engaged by the power arm as it moves downwardly, the engagement occurring soon after the beginning of the movement of the arm 20 from its raised position.

When the power arm 20 engages the defroster element 48, it will move it downwardly, carrying the pivot 62 with it. The pivot 62 will push on the toggle lever 64 for moving the pivot 60, the toggle lever 58 and the pivot 56 also downwardly. Downward movement of the pivot 56 swings the arm 52 to the full line position, with the tension of the spring 68 increasing for thus loading the power arm 20 and causing a higher temperature in the bulb D to operate the switch arm 24 to closed circuit position. In this manner, defrosting of the cooling unit C occurs before the motor M is again energized.

As the pivot 56 moves downwardly, the lug 58a will engage the stationary arm 46 and swing the toggle lever 58 in a counter-clockwise direction, as indicated by the arrow b in Figure 2.

After the full line position of Figure 2 is assumed, the pivot 60 will be beyond the center line illustrated in this figure and the lever 58 will snap to the off position for discontinuing the defrosting operation and permitting the switch contacts 12 and 14 to become engaged for again initiating normal cycles of operation of the refrigerator. Thus a single manually obtained defrosting cycle is accomplished and the control structure is reset for then obtaining normal cycles of operation.

The spring 30 may be more or less tensioned because of the position of the knob 38 relative to the hub 102 and to compensate for a high tension in this spring, which would cause a higher defrosting limit if the tension of the loading spring 68 were constant, I provide the lever 36 which lowers the tension of the spring 68 in proportion to the increase in the tension of the spring 30 and vice versa. Thus a control structure is provided in which defrosting can be manually secured and the upper temperature limit of the defrosting cycle remains practically constant regardless of the setting for range of the switch due to the position of the knob 38.

In Figures 4, 5, 6 and 7, the defroster control, when moved to the defrost position of Figure 5, will have the pin 92 in the full line position of Figure 6, causing the notch 84 to register with the lug 74b of the defroster element. This permits the tension of the loading spring 80 to be imposed on the power arm 20 to oppose it in its movement toward switch closing position. The compensator arm 76 will decrease the tension of the spring 80 whenever the tension of the spring 30 is increased and vice versa, thus compensating for adjustment of the knob 38 to one of the numbered positions on the hub 102 after moving the knob to the defrost position. When the knob is left in the defrost position, a defrosting cycle, or in other words, a high upper temperature limit for the control switch is provided each cycle of operation thereof.

When the pin 92 is moved forward to the dotted line position of Figure 6, or any other of the numbered positions, a single defrosting cycle will occur because the power arm 20 will lift the lug 74b on the defrosting cycle and the spring 88 will then rotate the cam 82 to the dotted line position so that in succeeding cycles of operation, the lug 74b will rest on the periphery of the cam 82 and will not be engaged by the power arm 20 early enough in its movement to cause a defrosting cycle. As stated before, in any position of the knob 38 or the pin 92 other than the dotted line position of Figure 6, the compensation feature will operate because of the compensator arm 76 being raised or lowered, depending on the adjustment of the knob 38.

If it is desired after setting the switch for defrosting operation to prevent either the single or continuous defrosting cycles, the knob 38 can be rotated to position "9" so that the cam 98 will engage the screw 100 and raise the lug 74b so that the cam 82 will spring to its dotted line position of Figure 6 and no defrosting will then occur. Thus it is possible to prevent the defrosting cycle or cycles, if after setting the control for defrosting, it is desired not to have it defrost, for instance, when it would be undesirable to raise the temperature of the refrigerator to the defrosting temperature because of certain commodities placed therein.

In either type of defroster, the compensation feature is utilized so that range adjustment does not operate to affect the upper temperature limit of the defrosting cycle.

Changes in the mechanism, such as illustrated in the two different types illustrated may be made without departing from the real spirit and purpose of my invention, and it is my intention to cover by my claims, any modified forms of structure or use of mechanical equivalents, which may be reasonably included within their scope.

I claim as my invention:

1. In a refrigerator control structure, a switch, a pressure operated bellows for operating said switch, a resistance device for normally resisting the switch closing movement of the bellows, a second resistance device, and a single control element movable for connecting the second resistance device to further resist the switch closing movement of the bellows and for adjusting both of said resistance devices to produce the same proportional change in opposite degree in each thereof.

2. In combination with an automatically movable member operable through cycles of operation and having adjustable means movable to travel between predetermined limits to change the range thereof, mechanism for modifying said cycles of operation comprising a modifying member selectively movable to operative and inoperative positions, said adjustable means being operatively associated therewith to render it repetitively operative in one position of the adjustable means at one limit of its limited path of travel, to render it inoperative in another position thereof and to render it operative through only one cycle of operation when moved to said first mentioned position and then to another position, said mechanism being associated with said adjustable means and rendered substantially equal in effect thereby when said adjustable means is in said another position.

3. In combination with an automatically movable member and adjustable means movable between predetermined limits to vary the range thereof, mechanism for modifying the cycles of operation of said automatically movable member comprising a resisting member selectively movable to operative and inoperative positions, said adjustable means being operatively associated therewith to render it operative in one position of the adjustable means, to render it inoperative in one adjusting position of the adjustable means and to render it operative through a single cycle when moved to said first mentioned position and then to another adjusting position of the adjustable means and maintaining one limit of the single cycle substantially stationary when the adjusting means is in said last mentioned position.

4. In combination with an automatically movable member operable through cycles of operation and having adjustable means movable to travel between predetermined limits to change the range thereof, mechanism for modifying said cycles of operation comprising a modifying member selectively movable to operative and inoperative positions, said adjustable means being operatively associated therewith to render it repetitively operative in one position of the adjustable means at one limit of its limited path of travel, to render it inoperative in another position thereof and to render it operative through only one cycle of operation when moved to said first mentioned position and then to other positions, said mechanism being associated with said adjustable means and rendered substantially equal in effect thereby when said adjustable means is in any of said other positions.

5. In a control structure, a switch, a pressure operated member for moving said switch, a resistance device for normally resisting the switch moving movement of said pressure operated member, a second resistance device and a single control element movable for connecting the second resistance device to further resist the switch moving movement of the pressure operated member and for simultaneously therewith adjusting both of said resistance devices to produce the same proportional change in opposite degree in each thereof.

6. In combination with an automatically movable member operable through cycles of operation and having adjustable means movable to travel between predetermined limits to change the range thereof, mechanism for modifying said cycles of operation comprising a modifying member selectively movable to operative and inoperative positions, said adjustable means being operatively associated therewith to render it operative in one position of the adjustable means and to render it inoperative in another position thereof, said mechanism being associated with said adjustable means and rendered substantially equal in effect thereby when said adjustable means is in said another position.

7. In combination with an automatically movable member operable through cycles of operation and having adjustable means movable to travel between predetermined limits to change the range thereof, mechanism for modifying said cycles of operation comprising a modifying member selectively movable to operative and inoperative positions, said adjustable means being operatively associated therewith to render it repetitively operative in one position of the adjustable means, to render it inoperative in another position thereof and to render it operative through only one cycle of operation when moved to said first mentioned position and then to another position, said mechanism being associated with said adjustable means and rendered substantially equal in effect thereby when said adjustable means is in said another position.

8. In combination with an automatically movable member and adjustable means movable between predetermined limits to vary the range thereof, mechanism for modifying the cycles of operation of said automatically movable member comprising a resisting member selectively movable to operative and inoperative positions, said adjustable means being operatively associated therewith to render it operative in one position of the adjustable means and to render it inoperative in another position of the adjustable means and maintaining one limit of the single cycle substantially stationary when the adjusting means is in said first mentioned position.

9. In combination with an automatically movable member operable through cycles of operation and having adjustable means movable to travel between predetermined limits to change the range thereof, mechanism for modifying said cycles of operation comprising a modifying member selectively movable to operative and inoperative positions, said adjustable means being operatively associated therewith to render it repetitively operative in one position of the adjustable means, to render it inoperative in another position thereof and to render it operative through only one cycle of operation when moved to said first mentioned position and then to other positions, said mechanism being associated with said adjustable means and rendered substantially equal in effect thereby when said adjustable means is in any of said other positions.

10. In a control structure, a switch, a pressure operated member for operating said switch, a compression spring for normally resisting the switch operating movement of the pressure operated member, a second compression spring and a single control element movable for connecting the second compression spring to further resist the switch moving movement of the pressure operated member and for simultaneously therewith adjusting both of said compression springs to produce the same proportional change in opposite degree in each thereof.

MALCOLM E. HENNING.